United States Patent [19]

Dale

[11] Patent Number: 4,618,028

[45] Date of Patent: Oct. 21, 1986

[54] TREE STEP

[76] Inventor: Jerry D. Dale, 48 N. Lincoln St., Cottage Hills, Ill. 62018

[21] Appl. No.: 812,825

[22] Filed: Dec. 23, 1985

[51] Int. Cl.[4] ....................... A63B 29/04; A01M 31/00

[52] U.S. Cl. ....................................... 182/92; 248/231

[58] Field of Search ..................... 182/92, 90, 91, 228, 182/134; 248/218.4, 231, 230

[56] References Cited

U.S. PATENT DOCUMENTS

| | | | |
|---|---|---|---|
| 939,318 | 11/1909 | Redman | 248/231 |
| 1,153,750 | 9/1915 | Berry | 182/92 |
| 4,027,742 | 6/1977 | House | 182/92 |
| 4,109,761 | 8/1978 | Matlock | 182/92 |

FOREIGN PATENT DOCUMENTS

| | | | |
|---|---|---|---|
| 1312206 | 11/1962 | France | 182/92 |

*Primary Examiner*—Reinaldo P. Machado

*Attorney, Agent, or Firm*—Senniger, Powers, Leavitt & Roedel

[57] ABSTRACT

A tree step which provides a safe and efficient method for a person to climb a tree without inflicting damage to the tree. The device comprises a frame having a pair of hooks thereon, a landing projecting from the frame for placement of a foot, and a line for securing the frame to the tree. The line is secured at one end to the frame and has an intermediate reach which encircles the tree and a free end reach which is adapted to be wound a plurality of times around the hooks. The frame is then moved relative to the tree to lock the line in place around the hooks.

24 Claims, 9 Drawing Figures

TREE STEP

BACKGROUND OF THE INVENTION

This invention relates generally to a frame and means for removably securing the frame to a slender object, and more particularly to a tree step and means for securing a tree step to a tree.

Tree steps of current manufacture have various disadvantages. For example, one type of tree step is formed with a threaded shank which is screwed into a tree to secure the step in place. The resultant hole in the tree can result in significant damage and possibly even death to the tree. The procedure is also time consuming and sometimes difficult to accomplish.

SUMMARY OF THE INVENTION

Among the several objects of this invention is the provision of a tree step which can be installed quickly, quietly and easily; the provisions of such a step having superior strength; and the provision of such a step which inflicts no damage to the tree.

Generally, a tree step of this invention comprising a frame and means for securing the frame to a tree, said means comprising a pair of hooks on the frame, each hook having a mouth for entry into a space bounded by the hook, and a line secured at one end to the frame having an intermediate reach adapted to encircle the tree and a free end reach adapted to be wound a plurality of times around the hooks, with each wind of line passing through the mouths of the hooks into said hook spaces. The mouth of at least one hook is sufficiently narrow to permit passage therethrough of only one diameter of line at a time whereby after the free end reach of line is wound around the hooks, the frame may be moved relative to the tree to effect passage of a portion of the intermediate reach of line through the mouth of said one hook to a position in the hook space blocking passage of the end reach back out through the mouth thereby to prevent the line from unwinding from the hooks.

Generally, a method of this invention involves securing a tree step to a tree. The step is of the type comprising a frame, a pair of hooks on the frame, each hook having a mouth for entry into a space bounded by the hook, and a line secured at one end to the frame having an intermediate reach and a free end reach. The method comprises the steps of positioning the frame on a tree, passing the intermediate reach of line around the tree to encircle it, winding the free end reach of line a plurality of times around the hooks on the frame, with each wind of line passing through the mouths of the hooks into said hook spaces, the mouth of at least one hook being sufficiently narrow to permit passage therethrough of only one diameter of line at a time, and moving the frame relative to the tree after the line is wound around the hooks to effect passage of a portion of the intermediate reach of line through the mouth of said one hook to a position in the hook space blocking passage of the end reach back out through the mouth thereby to prevent the line from unwinding from the hooks.

Even more generally, the present invention is directed to a frame and means for securing the frame to a slender object in the manner described above.

BRIEF DESCRIPTION OF THE PREFERRED EMBODIMENTS

Figure 1:
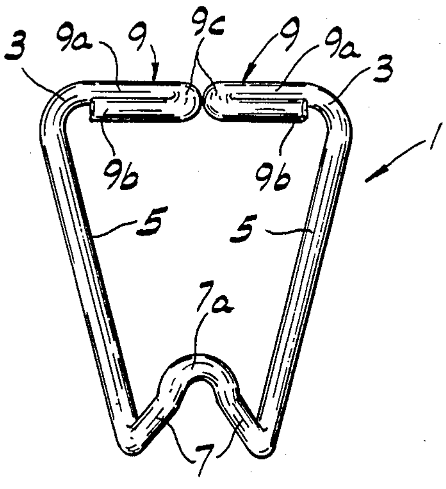
FIG. 1 is a front elevation view of the step of the present invention.
Figure 2:
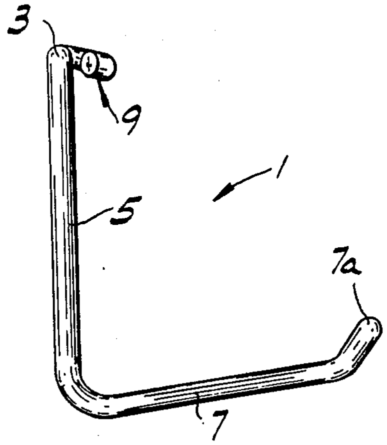
FIG. 2 is a side view of the step.
Figure 3:
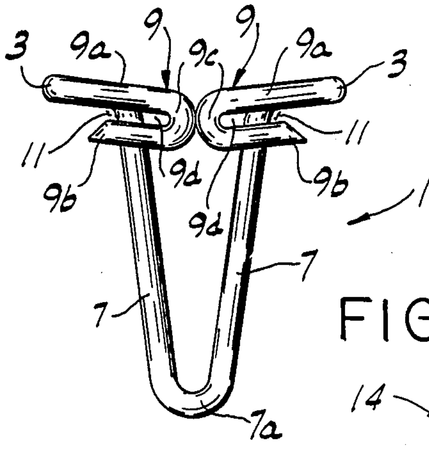
FIG. 3 is a plan view of the step.
Figure 7:
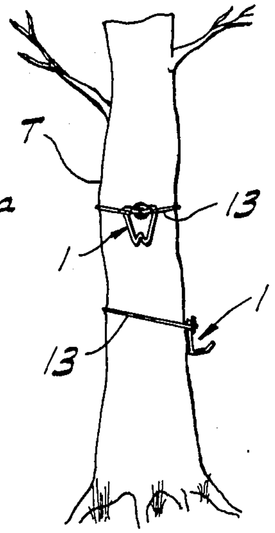
FIG. 7 is a perspective view of a plurality of steps mounted on a tree.
Figure 8:
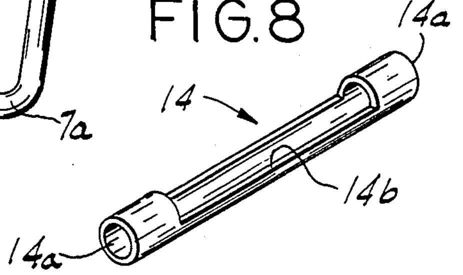
FIG. 8 is a perspective view of a line protector.
Figure 9:
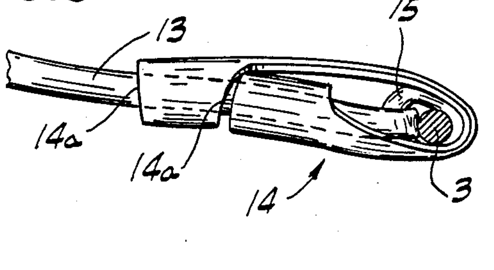
FIG. 9 is a detailed view of the line protector on a line secured to a frame.

Referring now in detail to the drawings, a plurality of tree steps of the present invention, each designated in its entirety by the reference numeral 1, can be used to assist persons such as hunters to climb a tree T (FIG. 7). As shown best in FIGS. 1–3, the step 1 includes a frame having a top comprising a pair of top frame members, each designated 3, extending toward one another and curved to conform to the trunk of tree T, opposite sides 5 extending down from the top frame members 3 and angling inward towards one another, and a bottom which projects outwardly from the sides 5 of the frame 1 to form a landing 7. As illustrated in FIG. 2, the landing 7 angles slightly upward from the sides 5 and has a bent tip *7a* which angles upward at a steeper angle than landing 7. The upward inclination of landing 7 and tip *7a* prevents slippage of a foot on landing 7. The frame is preferably formed from bent metal rod (e.g. 5/16-inch tempered steel rod).

Figure 4:
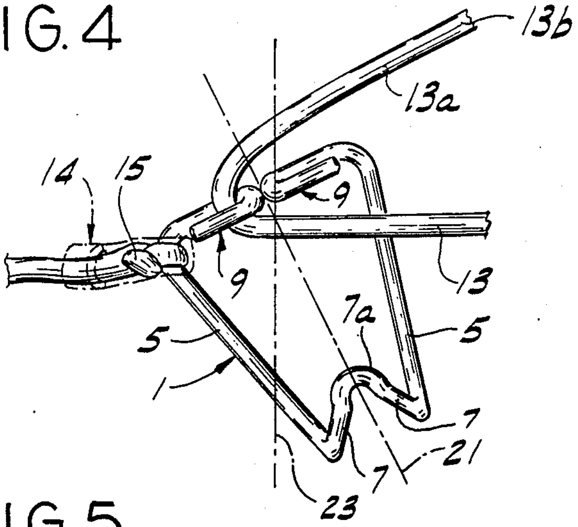
FIGS. 4–6 are views illustrating how the step is secured to a tree.
Figure 5:
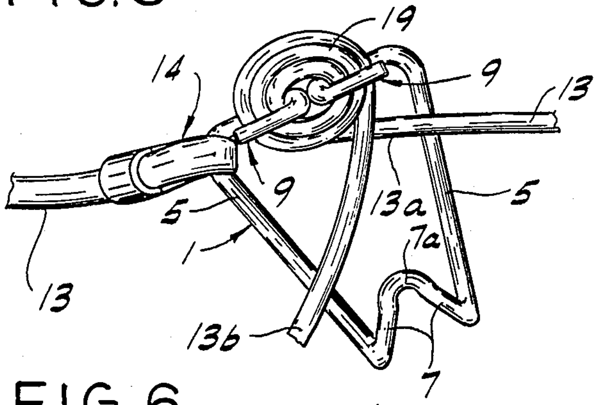

Means for securing the frame 1 to tree T comprises a pair of hooks, each generally indicated at 9, at the top of frame 1 and a line 13 secured at one end by a knot, for example, as indicated at 15, to the frame (FIG. 4). The line has an intermediate reach 13*a* adapted to encircle tree T and a free end reach 13*b* adapted to be wound a plurality of times around hooks 9 (FIGS. 4–7). The line may be braided nylon rope, for example. A line protector, designated in its entirety by reference numeral 14, is attached to the line 13 at the location where the line is secured to frame 1 (FIGS. 4–6, 8 and 9). This protector 14 comprises a tubular member of flexible material (e.g., plastic) having open ends, each designated 14*a*, and an elongated notch or cutout 14*b* extending axially of the tubular member in the sidewall thereof. The protector is folded over on itself around top frame member 3 to a position (FIG. 9) wherein it substantially encloses knot 15 and its ends are in substantial alignment for receiving line 13 therethrough. The line protector protects knot 15 and thus prevents line 13 from becoming unfastened from frame 1.

The hooks 9 are formed by reverse bends in the top frame members 3 and are thereby generally U-shaped and generally coplanar with respect to each other. The hooks 9 open in opposite directions, with each hook having opposite side portions *9a, 9b* and a closed end portion *9c* bounding a hook space *9d*. The closed end portions *9c* of the two hooks are positioned in substantially abutting relation. Each hook 9 has a mouth 11 with an opening sufficiently narrow to permit the passage therethrough of only one diameter of line at a time (FIG. 3) into the respective hook space *9d*.

Figure 6:
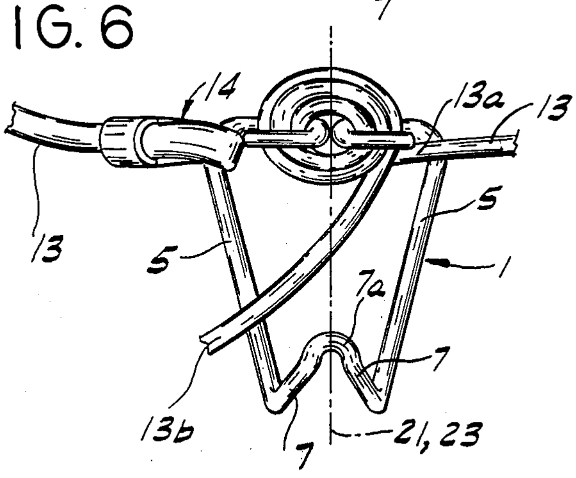

The method of securing a step 1 to tree T is best illustrated in FIGS. 4–7. The frame 1 of a step is positioned on tree T such that the central axis 21 of frame 1 is skewed with respect to the vertical axis 23 of tree T. The intermediate reach 13*a* of line 13 is passed around tree T to encircle it, and the free end reach 13*b* of line 13 is wound a plurality of times (e.g. three times) around hooks 9, as illustrated at 19, with each wind of line 13 passing through the mouths 11 of hooks 9 into the hook spaces 9*d*. The mouth 11 of at least one hook 9 (the right hook as illustrated in FIGS. 4–7) is sufficiently narrow to permit the passage therethrough of only one diameter of line 13 at a time. Frame 1 is locked into its final position by moving frame 1 such that the central axis 21 of frame 1 is substantially in line with the vertical axis 23 of tree T thereby to effect passage of the intermediate reach of line 13*a* through the mouth of the one hook to a position in hook space 9*d* blocking passage of the free end reach 13*b* out through the mouth 11 and thereby preventing the line 13 from unwinding from hooks 9 (FIG. 6).

While the present invention has particular application to tree steps, as described above, it will be understood that it may have other applications. For example, it is contemplated that the teachings of the present invention can be used to secure any frame having a pair of hooks thereon (comparable to hooks 9) to any slender object by means of a line in the manner described above.

In view of the above, it will be seen that the several objects of the invention are achieved and other advantageous results attained.

As various changes could be made in the above constructions without departing from the scope of the invention, it is intended that all matter contained in the above description as shown in the accompanying drawings shall be interpreted as illustrative and not in a limiting sense.

What is claimed is:

1. A tree step comprising a frame and means for securing the frame to a tree, said means comprising a pair of hooks on the frame, each hook having a mouth for entry into a space bounded by the hook, and a line secured at one end to the frame having an intermediate reach adapted to encircle the tree and a free end reach adapted to be wound a plurality of times around the hooks, with each wind of line passing through the mouths of the hooks into said hook spaces, the mouth of at least one hook being sufficiently narrow to permit passage therethrough of only one diameter of line at a time whereby after said free end reach of line is wound around the hooks, said frame may be moved relative to the tree to effect passage of a portion of said intermediate reach of line through the mouth of said one hook to a position in said hook space blocking passage of said end reach back out through said mouth thereby to prevent the line from unwinding from the hooks.

2. A tree step as set forth in claim 1 wherein the mouths of said hooks open in generally opposite directions.

3. A tree step as set forth in claim 2 wherein said hooks are generally U-shaped, each having opposite side protions and a closed end portion, said hooks being disposed with their closed ends in substantially abutting relation.

4. A tree step as set forth in claim 3 wherein said hooks are generally coplanar.

5. A tree step as set forth in claim 3 wherein said frame has a top, a bottom and opposite sides, the bottom of the frame projecting outwardly from the sides of the frame to form a landing for placement of a foot.

6. A tree step as set forth in claim 5 wherein the top of the frame is curved to conform to the trunk of a tree.

7. A tree step as set forth in claim 5 wherein the hooks are at the top of the frame.

8. A tree step as set forth in claim 7 wherein said top comprises a pair of top frame members extending toward one another from opposite sides of the frame and having reverse bends therein forming said hooks.

9. A tree step as set forth in claim 8 wherein said frame is formed of bent metal rod.

10. A tree step as set forth in claim 1 further comprising a line protector for the protecting of said one end of the line secured to the frame, said line protector comprising a flexible tubular member having open ends and an elongate notch therein extending axially of the tubular member in a sidewall thereof, said line protector being folded over on itself around the frame to a position wherein it substantially encloses said one end of the line and its open ends are in substantial alignment for receiving said one end of the line therethrough.

11. A method of securing a tree step to a tree, said step comprising a frame, a pair of hooks on the frame, each hook having a mouth for entry into a space bounded by the hook, and a line secured at one end to the frame having an intermediate reach and a free end reach, said method comprising the following steps:

positioning the frame on a tree;

passing said intermediate reach of line around the tree to encircle it;

winding said free end reach of line a plurality of times around said hooks on the frame, with each wind of line passing through the mouths of the hooks into said hook spaces, the mouth of at least one hook being sufficiently narrow to permit passage therethrough of only one diameter of line at a time; and moving the frame relative to the tree after the line is wound around the hooks to effect passage of a portion of said intermediate reach of line through the mouth of said one hook to a position in said hook space blocking passage of said end reach back out through the mouth thereby to prevent the line from unwinding from the hooks.

12. A method as set forth in claim 11, said frame having a central axis, said postioning step involving holding the frame on the tree in a position wherein its central axis is skewed with respect to the vertical axis of the tree, said moving step involving rotating the frame to a position wherein the central axis of the frame is substantially aligned with the vertical axis of the tree.

13. A frame and means for securing the frame to a long slender member, said means comprising a pair of hooks on the frame, each hook having a mouth for entry into a space bounded by the hook, and a line secured at one end to the frame having an intermediate reach adapted to encircle said slender member and a free end reach adapted to be wound a plurality of times around the hooks, with each wind of line passing through the mouths of the hooks into said hook spaces, the mouth of at least one hook being sufficiently narrow to permit passage therethrough of only one diameter of line at a time whereby after said free end reach of line is wound around the hooks, said frame may be moved relative to said slender member to effect passage of a portion of said intermediate reach of line through the mouth of said one hook to a position in said hook space blocking passage of said end reach back out through said mouth thereby to prevent the line from unwinding from the hooks 14. A frame and securing means as set forth in claim 13 wherein the mouths of said hooks open in generally opposite directions.

15. A frame and securing means as set forth in claim 14 wherein said hooks are generally U-shaped, each having opposite side protions and a closed end portion, said hooks being disposed with their closed ends in substantially abutting relation.

16. A frame and securing means as set forth in claim 15 wherein said hooks are generally coplanar.

17. A frame and securing means as set forth in claim 15 wherein said frame has a top, a bottom and opposite sides, the bottom of the frame projecting outwardly from the sides of the frame to form a landing for placement of a foot.

18. A frame and securing means as set forth in claim 17 wherein the top of the frame is curved to conform to said slender member.

19. A frame and securing means as set forth in claim 17 wherein the hooks are at the top of the frame.

20. A frame and securing means as set forth in claim 19 wherein said top comprises a pair of top frame members extending toward one another from opposite sides of the frame and having reverse bends therein forming said hooks.

21. A frame and securing means as set forth in claim 20 wherein said frame is formed of bent metal rod.

22. A frame as set forth in claim 13 further comprising a line protector for the protecting of said one end of the line secured to the frame, said line protector comprising a flexible tubular member having open ends and an elongate notch therein extending axially of the tubular member in a sidewall thereof, said line protector being folded over on itself around the frame to a position wherein it substantially encloses said one end of the line and its open ends are in substantial alignment for receiving said one end of the line therethrough.

23. A method of securing a frame to a slender member utilizing a pair of hooks on the frame, each hook having a mouth for entry into a space bounded by the hook, and a line secured at one end to the frame having an intermediate reach and a free end reach, said method comprising the following steps:

positioning the frame on said slender member;

passing said intermediate reach of line around said slender member to encircle it;

winding said free end reach of line a plurality of times around said hooks on the frame, with each wind of line passing through the mouths of the hooks into said hook spaces, the mouth of at least one hook being sufficiently narrow to permit passage therethrough of only one diameter of line at a time; and moving the frame relative to the slender member after the line is wound around the hooks to effect passage of a portion of said intermediate reach of line through the mouth of said one hook to a position in said hook space blocking passage of said end reach back out through the mouth thereby to prevent the line from unwinding from the hooks.

24. A method as set forth in claim 12, said frame having a central axis, said postioning step involving holding the frame on the slender member in a position wherein its central axis is skewed with respect to the central longitudinal axis of said slender member, said moving step involving rotating the frame to a position wherein the central axis of the frame is substantially aligned with said central axis of said slender member.

* * * * *